United States Patent [19]

Maguire

[11] 4,030,730

[45] June 21, 1977

[54] SYMMETRICAL SEAL ASSEMBLY FOR A HINGE JOINT

[75] Inventor: Roy L. Maguire, Edelstein, Ill.

[73] Assignee: Caterpillar Tractor Co., Peoria, Ill.

[22] Filed: Oct. 31, 1975

[21] Appl. No.: 627,824

[52] U.S. Cl. .............................. 277/92; 277/206 R; 277/164
[51] Int. Cl.² ......................................... F16J 15/34
[58] Field of Search ............. 277/206 R, 205, 92, 277/164, 176

[56] References Cited

UNITED STATES PATENTS

| | | | |
|---|---|---|---|
| 2,760,794 | 8/1956 | Hartranft | 277/92 |
| 3,027,909 | 4/1962 | Swain | 277/164 |
| 3,418,001 | 12/1968 | Rentschler et al. | 277/177 |
| 3,713,660 | 1/1973 | Luthe | 277/206 R |
| 3,841,718 | 10/1974 | Reinsma | 277/206;164 |
| 3,848,880 | 11/1974 | Tanner | 277/176 |
| 3,869,132 | 3/1975 | Taylor et al. | 277/205 |

*Primary Examiner*—Robert I. Smith
*Attorney, Agent, or Firm*—Phillips, Moore, Weissenberger Lempio & Majestic

[57] ABSTRACT

A seal for a joint subjected to oscillatory motion has a substantially U-shaped seal ring disposed between axially facing end walls of first and second members. Such seal ring defines an outwardly facing annular groove, in which is seated a load ring which urges side portions of the seal ring into engagement with the axially facing end walls, the seal ring and load ring being symmetrical relative to the mid-circumferential planes thereof.

7 Claims, 3 Drawing Figures

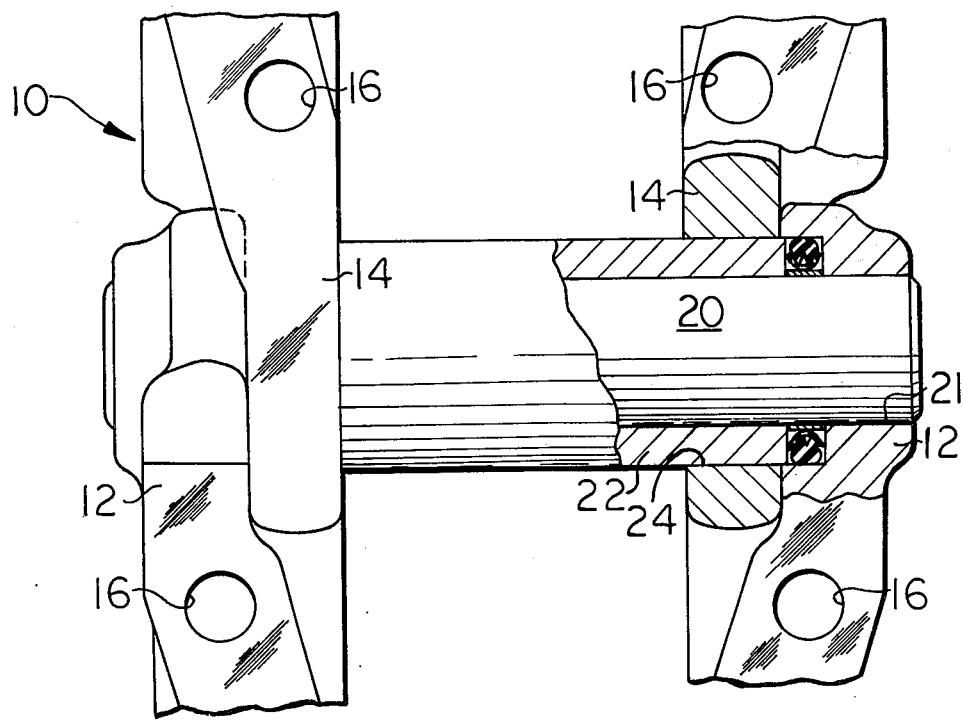
Fig_1_
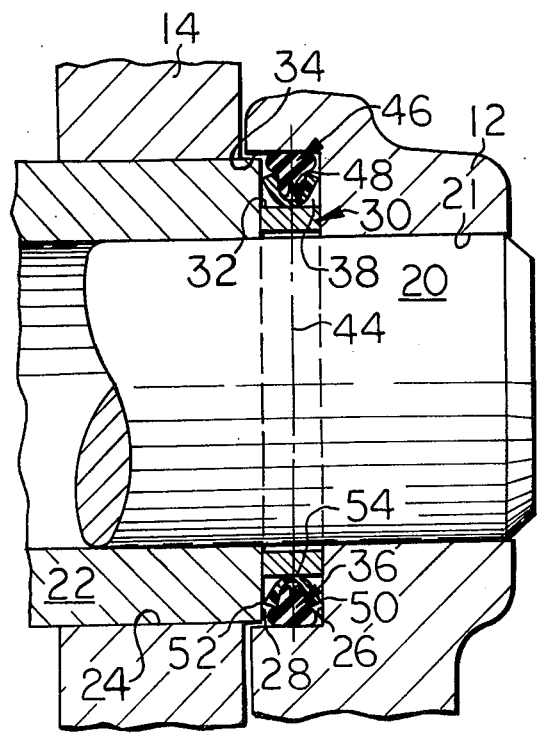
Fig_2_
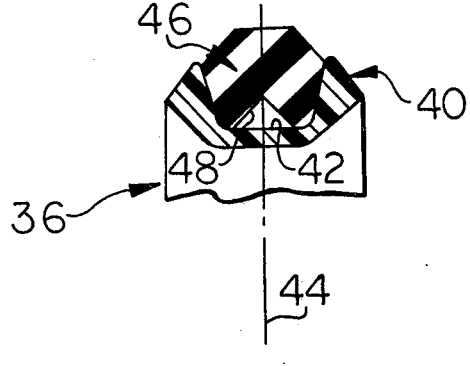
Fig_3_

SYMMETRICAL SEAL ASSEMBLY FOR A HINGE JOINT

BACKGROUND OF THE INVENTION

This invention relates to a seal, and more particularly, to a seal for a linkage which is subjected to oscillatory motion under widely varying conditions.

In U.S. Pat. No. 3,841,718 (assigned to the Assignee of this invention), a highly effective seal for a track link joint is disclosed. As shown therein, the seal includes a crescent seal ring and an outwardly positioned load ring associated therewith. While the operating characteristics of such a seal have been found to be highly satisfactory, it will be seen that the crescent-shaped seal ring is asymmetrical relative to the mid-circumferential plane of such seal ring. Likewise, the load ring is asymmetrical in relation to the mid-circumferential plane thereof.

While the operating characteristics of a properly positioned load ring and seal ring in accordance with U.S. Pat. No. 3,841,718 have been found to be excellent, it is possible to inadvertently install the entire seal assembly, made up of the seal ring and load ring, backward, and it is also possible to inadvertently install the load ring backward relative to the seal ring. This is so because of the asymmetrical shapes of such load ring and seal ring. In either of these cases, the seal assembly will not provide effective sealing.

Reissue Pat. No. 28,105 discloses a slipper seal in association with a load ring. However, such slipper seal, it will be seen, is not in contact with axially facing end walls. U.S. Pat. No. 3,027,909 and U.S. Pat. No. 3,848,880 disclose seal assemblies wherein no load ring is utilized. This is also the case with U.S. Pat. No. 3,713,660.

U.S. Pat. No. 3,869,132 discloses a sealing ring associated with an inwardly disposed metallic C-ring, with no disclosure of a load ring disposed outwardly of the sealing ring.

SUMMARY OF THE INVENTION

It is accordingly an object of this invention to provide a seal ring and load ring with specific geometries so that the problem of possible reversal of parts does not exist.

It is a further object of this invention to construct a seal ring and load ring which, while fulfilling the above object, is extremely effective in acting as a seal assembly in association with track links.

Broadly stated, the invention comprises a seal assembly comprising first and second axially spaced members mounted for relative rotation about a common axis, and defining first and second axially facing end walls respectively. A resilient seal ring defines a continuous outwardly facing annular channel so as to be of continuously uniform, generally U-shaped cross-section, the cross-section thereof being substantially symmetrical in relation to the mid-circumferential plane of the seal ring, the seal ring being positioned between the first and second axially facing end walls. A resilient load ring is disposed within the annular channel and is sized to urge the first and second portions of the seal ring into contact with the first and second axially facing end walls respectively.

BRIEF DESCRIPTION OF THE DRAWINGS

These and other objects of the invention will become apparent from a study of the following specification and drawings, in which:

FIG. 1 is a fragmentary plan view, partially broken away to show details of construction of a track linkage incorporating a seal constructed in accordance with the present invention;

FIG. 2 is an enlarged view of a portion of FIG. 1; and,

FIG. 3 is a cross-sectional view of the seal, removed from the track linkage of FIGS. 1 and 2.

DESCRIPTION OF THE PREFERRED EMBODIMENT

In FIG. 1, a portion of an endless track in a track mechanism for a track-type tractor is indicated generally by the referenced numeral 10. The track 10 includes outer links 12 and inner links 14. Track shoes (not shown in the drawings) are connected to the links 12, 14 by bolts which extend through bolt holes 16.

The overlapping ends of the links 12, 14 are connected in a pin joint connection in relative rotation by a pin 20 press-fitted into bores 21 defined by the outer links 12. A bushing 22 is connected to the inner links 14 by a press-fit connection between the bushing 22 and bores 24 in the ends of the inner links 14. Thus, during relative rotation of the links 12, 14, as happens when the track 10 passes over a sprocket, the pin 20 rotates within the inner bore of the bushing 22.

It will be seen that the links 12, 14 are relatively rotatable about a common axis, i.e., the longitudinal axis of the pin 20. Also, the links 12 and bushing 22 relatively rotate about such longitudinal axis of the pin 20.

The end of the link 12 defines an annular end wall 26, and the bushing 22 adjacent such end wall defines an end wall 28, with the end walls 26, 28 axially facing each other. A thrust ring 30 is disposed about the pin 20 adjacent the end walls 26, 28 to provide spacing therebetween. Such thrust ring 20 defines a radially outwardly facing surface 32. The end of the link 12 defines a radially inwardly facing surface 34.

The seal of the present invention, generally indicated at 36, is disposed within the annular cavity 38 defined by the end walls 26, 28, radially outwardly facing surface 32, and radially inwardly facing surface 34. Such seal 36 is utilized to present leakage of lubricants from within the inner bore of the bushing 22 and to prevent the entry of foreign matter into the inner bore of the bushing 22.

A portion of the seal 36 is shown in its rest position in FIG. 3. The seal 36 includes an elastomeric ring 40 which defines a continuous outwardly facing channel 42 so as to be of continuously uniform, generally U-shaped cross-section (see FIG. 2 also). As noted in such FIGS. 2 and 3, the cross-section of the seal ring 40 is symmetrical in relation to the mid-circumferential plane 44 of such seal ring 40.

A resilient elastomeric load ring 46 is disposed within the annular channel 42 as shown. The resilient load ring 46 is also continuously uniform in cross-section, with the cross-section thereof being substantially symmetrical in relation to the mid-circumferential plane 44 of the load ring 46. The load ring 46 defines an inwardly facing annular groove 48 of substantially V-shape adjacent the seal ring 40 with the load ring 46 so disposed in the annular channel 42 defined in the seal ring 40.

In the use of such seal 36, the seal ring 40 and load ring 46 associated therewith are positioned about the thrust ring 30, and between the end walls 26, 28 during the assembly of the structure. As the end walls 26, 28 are brought together, closing to an extent the legs of the generally U-shaped cross-section of the seal ring 40, the load ring 46 is laterally compressed. The load ring 46 thereby urges opposite portions 50, 52 of the seal ring 40 into contact with the end walls 26, 28 respectively. The load ring 46 is configured so that it is in contact with the radially inwardly facing surface 34 to further aid in the urging of the portions 50, 52 of the seal ring 40 into contact with the end walls 26, 28. Additionally, the base portion 54 of the seal ring 40 is urged into contact with the thrust ring 30 by the load ring 46, partially through force applied to the load ring 46 by the radially inwardly facing surface 34.

It will be seen that an extremely effective seal is provided herein because of the particular configuration of the seal ring 40 and load ring 46 and associated structure. It is to be noted that the seal ring 40 and load ring 46 are symmetrical in relation to the respective mid-circumferential planes thereof (with the parts assembled as shown in the drawings, plane 44), to in turn render the assembly made up of the load ring 40 and seal ring 46 symmetrical in relation to the overall mid-circumferential plane 44 thereof. Through such symmetry, it will be seen that the seal 36 made up of seal ring 40 and load ring 46 can be reversed positionally relative to the mid-circumferential plane 44 thereof and still associate with the links 12, 14 for proper, effective sealing. Thus, the installer of such seal 36 need not concern himself with the directional installation of the seal 36, and the concern that he might possibly insert the seal 36 in a backward position.

What is claimed is:

1. A seal assembly comprising:
    first and second members mounted for relative rotation about a common axis, and defining first and second axially facing end walls respectively,
    a resilient seal ring defining a continuous outwardly facing annular channel so as to be of continuously uniform, generally U-shaped cross-section, the cross-section thereof being substantially symmetrical in relation to the mid-circumferential plane of said seal ring, said seal ring being positioned between the first and second axially facing end walls; and
    a resilient load ring disposed within said annular channel and sized to urge first and second portions of the seal ring into contact with the first and second axially facing end walls respectively.

2. The seal assembly of claim 1 wherein the resilient load ring is continuously uniform in cross-section and wherein the cross-section thereof is substantially symmetrical in relation to the mid-circumferential plane of the load ring.

3. The seal assembly of claim 2 and further comprising a thrust ring defining a radially outwardly facing surface against which a third portion of the seal ring is urged by said load ring.

4. The seal assembly of claim 3 wherein one of said first and second members defines a radially inwardly facing surface in contact with the load ring.

5. The seal assembly of claim 4 wherein said load ring is of elastomeric material, and wherein said load ring defines an inwardly facing annular groove adjacent the seal ring with the load ring so disposed in the annular channel defined by the seal ring.

6. The seal assembly of claim 2 wherein one of said first and second members defines a radially inwardly facing surface in contact with the load ring.

7. The seal assembly of claim 2 wherein said load ring is of elastomeric material, and wherein said load ring defines an inwardly facing annular groove adjacent the seal ring with the load ring so disposed in the annular channel defined by the seal ring.

* * * * *